(12) United States Patent
Chebotar et al.

(10) Patent No.: US 11,559,887 B2
(45) Date of Patent: Jan. 24, 2023

(54) OPTIMIZING POLICY CONTROLLERS FOR ROBOTIC AGENTS USING IMAGE EMBEDDINGS

(71) Applicant: GOOGLE LLC, Mountain View, CA (US)

(72) Inventors: Yevgen Chebotar, Los Angeles, CA (US); Pierre Sermanet, Palo Alto, CA (US); Harrison Lynch, San Francisco, CA (US)

(73) Assignee: Google LLC, Mountain View, CA (US)

( * ) Notice: Subject to any disclaimer, the term of this patent is extended or adjusted under 35 U.S.C. 154(b) by 418 days.

(21) Appl. No.: 16/649,596

(22) PCT Filed: Sep. 20, 2018

(86) PCT No.: PCT/US2018/052078
§ 371 (c)(1),
(2) Date: Mar. 20, 2020

(87) PCT Pub. No.: WO2019/060632
PCT Pub. Date: Mar. 28, 2019

(65) Prior Publication Data
US 2020/0276703 A1     Sep. 3, 2020

Related U.S. Application Data

(60) Provisional application No. 62/561,133, filed on Sep. 20, 2017.

(51) Int. Cl.
*G06N 20/00* (2019.01)
*G05B 13/02* (2006.01)
(Continued)

(52) U.S. Cl.
CPC ............. *B25J 9/163* (2013.01); *B25J 9/1664* (2013.01); *B25J 9/1697* (2013.01);
(Continued)

(58) Field of Classification Search
CPC ........ B25J 9/163; B25J 9/1664; B25J 9/1697; G06N 20/00; G06N 3/084; G06N 3/008;
(Continued)

(56) References Cited

U.S. PATENT DOCUMENTS 10,832,062 B1 * 11/2020 Evans .................... G06V 20/56
2010/0222924 A1 * 9/2010 Gienger ................ G05B 19/42
706/12
(Continued)

OTHER PUBLICATIONS

Liu, YuXuan, et al. Imitation From Observation: Learning to Imitate Behaviors from Raw Video via Context Translation. Jul. 11, 2017, https://arxiv.org/pdf/1707.03374v1.pdf. (Year: 2017).*
(Continued)

*Primary Examiner* — Jeff A Burke
*Assistant Examiner* — Joshua Alexander Garza
(74) *Attorney, Agent, or Firm* — Fish & Richardson P.C.

(57) ABSTRACT

There are provided systems, methods, and apparatus, for optimizing a policy controller to control a robotic agent that interacts with an environment to perform a robotic task. One of the methods includes optimizing the policy controller using a neural network that generates numeric embeddings of images of the environment and a demonstration sequence of demonstration images of another agent performing a version of the robotic task.

23 Claims, 6 Drawing Sheets

(51) Int. Cl.
G06N 3/08 (2006.01)
B25J 9/16 (2006.01)
(52) U.S. Cl.
CPC ....... *G05B 13/0205* (2013.01); *G05B 13/027* (2013.01); *G06N 3/084* (2013.01); *G06N 20/00* (2019.01)
(58) Field of Classification Search
CPC .............. G06N 3/0454; G05B 13/0205; G05B 13/027; H04N 7/181; G06K 9/00771; G06K 9/62
See application file for complete search history.

(56) References Cited

U.S. PATENT DOCUMENTS

| | | | |
|---|---|---|---|
| 2018/0144518 A1* | 5/2018 | Vlassis | G06K 9/6232 |
| 2018/0250826 A1* | 9/2018 | Jiang | G06V 10/764 |
| 2018/0260414 A1* | 9/2018 | Gordo Soldevila | G06N 3/084 |
| 2020/0057935 A1* | 2/2020 | Wang | G06F 17/15 |

OTHER PUBLICATIONS

Levine, Sergey, and Pieter Abbeel. Learning Neural Network Policies with Guided Policy Search under . . . 2014, https://proceedings.neurips.cc/paper/2014/file/6766aa2750c19aad2fa1b32f36ed4aee-Paper.pdf. (Year: 2014).*
Na, Seil, et al. "Encoding Video and Label Priors for Multi-Label Video Classification on Youtube-8M Dataset." ArXiv.org, Jul. 12, 2017, https://arxiv.org/abs/1706.07960. (Year: 2017).*
Misra, Ishan, et al. "Shuffle and Learn: Unsupervised Learning Using Temporal Order Verification."ArXiv.org, Jul. 26, 2016, https://arxiv.org/abs/1603.08561. (Year: 2016).*
JP Office Action in Japanese Application No. 2019-567999, dated Apr. 12, 2021, 5 pages (with English translation).
EP Office Action in European Application No. 18783292.8, dated May 14, 2021, 10 pages.
IN Office Action in Indian Application No. 201927046938, dated Jul. 26, 2021, 7 pages (with English translation).
Abbeel et al., "Apprenticeship learning via inverse reinforcement learning", Proceedings of the 21st International Conference on Machine Learning, 2004, pp. 1.
Argall et al., "A survey of robot learning from demonstration", Robotics and Autonomous Systems, 2009, 57(5):469-483.
Ayter et al., "Soundnet: Learning sound representations from unlabeled videos", Advances in Neural Information Processing Systems, 2016, pp. 892-900.
Calinon et al., "On learning, representing and generalizing a task in a humanoid robot", IEEE Transactions on Systems, Man, and Cybernetics, Part B, 2007, 37(2):286-298.
Chebotar et al., "Combining model-based and model-free updates for trajectory-centric reinforcement learning", Proceedings of the 34th International Conference on Machine Learning—vol. 70, pp. 703-711.
Deng et al., "ImageNet: A large-scale hierarchical image database", IEEE Conference on Computer Vision and Pattern Recognition, 2009, pp. 248-255.
Doersch et al., "Unsupervised visual representation learning by context prediction", Proceedings of the IEEE International Conference on Computer Vision, 2015, pp. 1422-1430.
Dragan et al., "Online customization of teleoperation interfaces", 2012 IEEE RO-MAN: The 21st IEEE International Symposium on Robot and Human Interactive Communication, 2012, pp. 919-924.
Duan et al., "One-shot imitation learning", Advances in Neural Information Processing Systems, 2017, pp. 1087-1098.
Dumoulin et al., "Adversarially learned inference", arXiv:1606.00704v3, Feb. 2017, 18 pages.
Fernando et al., "Self-supervised video representation learning with odd-one-out networks", Proceedings of the IEEE Conference on Computer Vision and Pattern Recognition, 2017, pp. 3636-3645.
Finn et al., "Learning visual feature spaces for robotic manipulation with deep spatial autoencoders", arXiv:1509.06113v1, Sep. 2015, 8 pages.
Goroshin et al., "Unsupervised learning of spatiotemporally coherent metrics", Proceedings of the IEEE International Conference on Computer Vision, 2015, pp. 4086-4093.
Ijspeert et al., "Movement imitation with nonlinear dynamical systems in humanoid robots", Proceedings of the 2002 IEEE International Conference on Robotics and Automation (Cat No. 02CH37292), 2002, 2:1398-1403.
International Preliminary Report on Patentability in International Application No. PCT/US2018/052078, dated Mar. 24, 2020, 11 pages.
International Search Report and Written Opinion in International Application No. PCT/US2018/052078, dated Dec. 14, 2018, 17 pages.
Kober et al., "Reinforcement learning in robotics: a survey", International Journal of Robotics Research, Aug. 2013, pp. 1238-1274.
Kumar et al., "Learning local image descriptors with deep Siamese and triplet convolutional networks by minimizing global loss functions", IEEE Conference on Computer Vision and Pattern Recognition, 2016, pp. 5385-5394.
Liu et al., "Imitation from Observation: Learning to imitate behaviors from Raw Video via Context Translation", Electrical Engineering and Computer Sciences University of California at Berkeley, May 2018, 11 pages.
Mathieu et al., "Deep Multi Scale Video Prediction Beyond Mean Square Error", arXiv:1511.05440v6, Feb. 2016, 14 pages.
Misra et al., "Unsupervised learning using sequential verification for action recognition", arXiv:1603.08561v2, Jul. 2016, 21 pages.
Moo et al., "LIFT: Learned invariant feature transform", European Conference on Computer Vision, Springer, Cham. 2016, pp. 467-483.
Mori et al., "Pose Embeddings: A deep architecture for learning to match human poses", arXiv:1507.00302v1, Jul. 2015, 9 pages.
Mulling et al., "Learning to select and generalize striking movements in robot table tennis", The International Journal of Robotics Research, 2013, 32(3):263-279.
Owens et al., "Visually indicated sounds", IEEE Conference on Computer Vision and Pattern Recognition, 2016, pp. 2405-2413.
Pastor et al., "Learning and generalization of motor skills by learning from demonstration", 2009 IEEE International Conference on Robotics and Automation, 2009, pp. 763-768.
Pathak et al., "Learning features by watching objects move", Proceedings of the IEEE Conference on Computer Vision and Pattern Recognition, 2017, pp. 2701-2710.
Paulin et al., "Local Convolutional Features with Unsupervised Training for Image Retrieval", IEEE International Conference on Computer Vision, 2015, pp. 91-99.
Pomerleau et al., "Efficient training of artificial neural networks for autonomous navigation", Neural Computation, 1991, 3(1):88-97.
Ratliff et al., "Imitation learning for locomotion and manipulation", 2007 7th IEEE-RAS International Conference on Humanoid Robots, 2007, pp. 392-397.
Ross et al., "A Reduction of Imitation Learning and Structured Prediction to No Regret Online Learning", Proceedings of the 14th International Conference on Artificial Intelligence and Statistics, 2011, pp. 627-635.
Schroff et al., "Facenet: A unified embedding for face recognition and clustering", Proceedings of the IEEE Conference on Computer Vision and Pattern Recognition, 2015, pp. 815-823.
Sermanet et al., "Time-contrastive networks: Self-supervised learning from video", 2018 IEEE International Conference on Robotics and Automation (ICRA), pp. 1134-1141.
Sermanet et al., "Unsupervised perceptual rewards for imitation learning", arXiv:1612.06699v3, Jun. 2017, 15 pages.
Simo-Serra et al., "Discriminative learning of deep convolutional feature point descriptors", Proceedings of the IEEE International Conference on Computer Vision, 2015, pp. 118-126.
Stadie et al., "Third Person Imitation Learning", arXiv:1703.01703v2, Sep. 2019, 16 pages.

(56) References Cited

OTHER PUBLICATIONS

Stewart et al., "Label free supervision of neural networks with physics and domain knowledge", Thirty-first AAAI Conference on Artificial Intelligence, 2017, 7 pages.
Szegedy et al., "Rethinking the inception architecture for computer vision", Proceedings of the IEEE Conference on Computer Vision and Pattern Recognition, 2016, pp. 2818-2826.
Vincent et al., "Extracting and composing robust features with denoising autoencoders", Proceedings of the 25th International Conference on Machine Learning, 2008, pp. 1096-1103.
Wang et al., "Unsupervised learning of visual representations using videos", Proceedings of the IEEE International Conference on Computer Vision, 2015, pp. 2794-2802.
Whitney et al., "Understanding visual concepts with continuation learning", arXiv:1602.06822v1, Feb. 2016, 4 pages.
Wiskott et al., "Slow feature analysis: Unsupervised learning of invariances", Neural Computation, 2002, 14(4):715-770.
Zagoruyko et al., "Learning to compare image patches via convolutional neural networks", Proceedings of the IEEE Conference on Computer Vision and Pattern Recognition, 2015, pp. 4353-4361.
Zhang et al., "Split-Brain autoencoders: Unsupervised learning by cross channel prediction", IEEE Conference on Computer Vision and Pattern Recognition, 2017, pp. 1058-1067.
JP Office Action in Japanese Application No. 2019-567999, dated Nov. 15, 2021, 4 pages (with English translation).
github.com [online], "Inception v3," May 26, 2020, retrieved on Nov. 15, 2022, retrived from URL<https://github.com/tensorflow/models/blob/master/research/slim/nets/inception_v3.py>, 13 pages.

\* cited by examiner

OPTIMIZING POLICY CONTROLLERS FOR ROBOTIC AGENTS USING IMAGE EMBEDDINGS

CROSS-REFERENCE TO RELATED APPLICATION

This application claims priority to U.S. Provisional Patent Application Ser. No. 62/561,133, filed Sep. 20, 2017, the entire contents of which are hereby incorporated by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that optimizes a policy controller that is used to select actions to be performed by a robotic agent interacting with an environment. In particular, the policy controller can be used to select actions so that the robotic agent can successfully perform a robotic task, e.g., an object grasping task, an object moving task, a navigation task, or another task that requires the agent to interact with the real-world environment for some specific purpose. In some cases, the policy controller is a trajectory-centric controller, e.g., a time-varying Gaussian controller. In other cases, the policy controller is a deep neural network.

The subject matter described in this specification can be implemented in particular embodiments so as to realize one or more of the following advantages. The system as described in this specification can make use of a neural network that has been trained to generate numeric embeddings that are invariant to certain transformations, e.g., invariant to transformations such as viewpoint, occlusions, motion-blur, lighting, background or object instances, to effectively optimize a policy controller to select actions to be performed by a robotic agent. Accordingly, the system can optimize the controller using only raw video demonstrations for supervision, i.e., without any explicit joint-level correspondence or other labeled data. In particular, the system can both train the time contrastive neural network that generates the embeddings and optimize the policy controller using only raw video data. Learned invariance to factors such as view transformation can improve robotic performance in imitating motion by another agent, for example. In particular, the described system can optimize a policy controller to control the agent to perform a task only from third-person images of another agent performing the task, even though only first-person images taken by the robotic agent are available while the robotic agent performs the task. That is, the system can effectively optimize the policy controller even when the viewpoint of the demonstration images is different from the viewpoint of the images captured by the robotic agent while the agent performs the task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
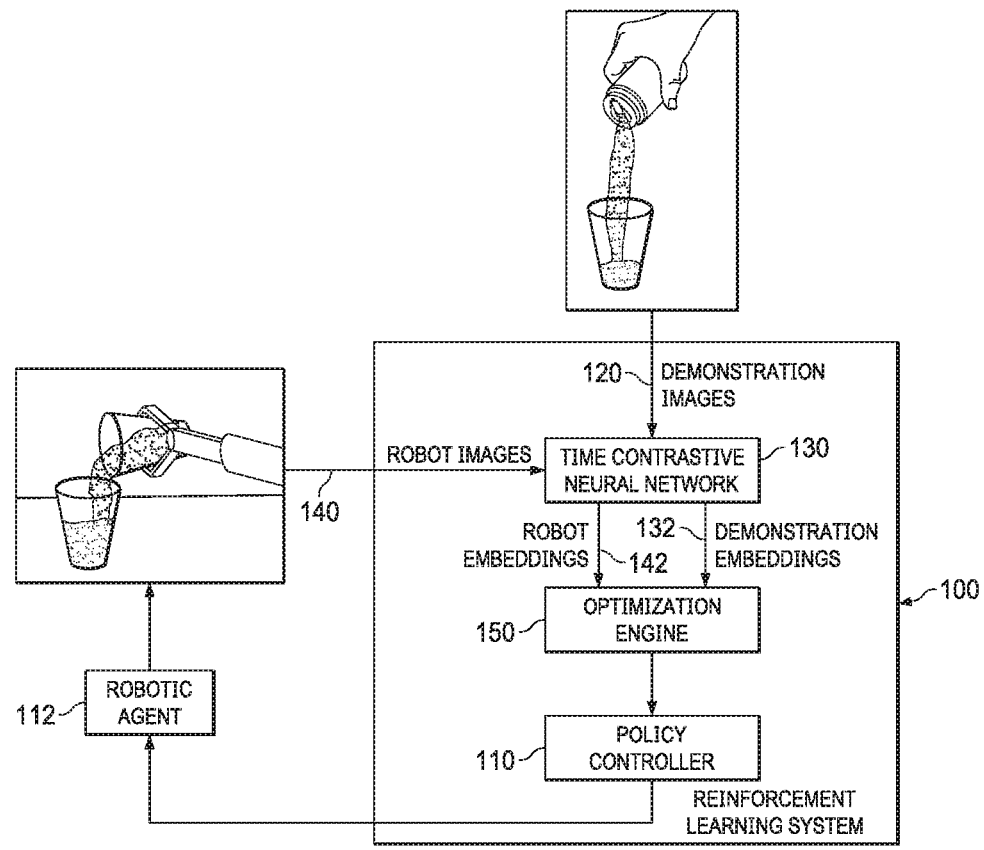
FIG. 1 shows an example reinforcement learning system.

FIG. 1 shows an example reinforcement learning system 100 that optimizes a policy controller 110 used to control a robotic agent 112. The reinforcement learning system 100 is an example of a system implemented as computer programs on one or more computers in one or more locations in which the systems, components, and techniques described below are implemented. The robotic agent 112 may be, e.g., a robotic arm or a more complex robot.

The policy controller 110 is a controller that is used to select actions to be performed by the robotic agent 112 as the robotic agent 112 interacts with an environment. In particular, the policy controller 110 receives data characterizing the current state of the environment and generates an output that defines an action to be performed by the robotic agent 112. The data can be features of the current state and the output can define a control input for the robotic agent, e.g., torques to be applied to one or more joints of the robotic agent. For example, the output can be, for each joint, the parameters of a distribution from which the torque can be sampled.

In some cases, the features of the current state are low-dimensional features, e.g., a low-dimensional feature vector or feature matrix, characterizing the state of the environment and the policy controller 110 is a trajectory-centric controller, e.g., a time-varying Gaussian controller. For example, the features can include for each joint of the robotic agent 112 a respective current joint angle and current joint velocity. In some cases, the features of the current state can also include features, e.g., a feature vector, characterizing the environment external to the agent. For example, the feature vector can be an embedding of an image of the environment captured by a camera of the agent 112, e.g., an embedding generated by a time-contrastive neural network 130 as will be described in more detail below.

In some other cases, the features of the current state are high-dimensional features, e.g., images captured by the robotic agent 112 as the agent interacts with the environment, and the policy controller 110 is a deep neural network, e.g., a convolutional neural network or a recurrent neural network.

For the policy controller 110 to control the robotic agent 112 means that the system 100 or another system causes the robotic agent 112 to perform the actions that are defined by the outputs of the policy controller 110, i.e., by providing the control inputs to the robotic agent 112 or to a control system for the robotic agent 112.

The system 100 optimizes the policy controller 110 so that the policy controller 110 can be used to control the robotic agent 112 to cause the robotic agent 112 to successfully perform a robotic task, e.g., an object grasping task, an object moving task (e.g., pouring water from one container to another or moving a container from one location to another), a navigation task, or another task that requires the agent to interact with the real-world environment for some specific purpose.

In particular, the system 100 optimizes the policy controller 110 using a demonstration sequence of demonstration images 120 of another agent, e.g., another robotic agent or a human demonstrator, performing a version of the specified task. That is, each of the demonstration images 120 are images of the other agent captured while the other agent performs the version of the specific task. Generally, the demonstration sequence will include images starting from when the other agent first begins to perform a task and ending with the other agent successfully completing the task. For example, the demonstration images 120 in the sequence may be captured at regular intervals while the demonstrating agent performs the task. The version of the specified task may be the same as the specified task to be performed by the robotic agent 112 or may differ in certain ways from the task to be performed by the robotic agent 112. For example, if the task for which the controller is to be optimized is to move an object to a destination location in the environment, the version of the task performed in the demonstration images may move a somewhat different object from the object that the robotic agent 112 will be tasked with moving, e.g., an object that is a different color, has a different shape, or has other different properties from the object that the agent 112 will be tasked with moving.

The system 100 processes each demonstration image 120 in the demonstration sequence using a time contrastive neural network 130 to generate a respective demonstration embedding 132 of each of the demonstration images.

The time contrastive neural network 120 is a neural network that has been trained to receive an input image of the environment and to process the input image to generate a numeric embedding, e.g., a vector or other ordered collection of numeric values, of the input image that characterizes a state of the environment as depicted in the input image. Because of the way that the time contrastive neural network 130 has been trained, the numeric embeddings generated by the neural network 130 characterize properties of the scene depicted in an input image while being invariant to certain transformations, e.g., transformations such as viewpoint, occlusions, motion-blur, lighting, background or object instances. Training the time-contrastive neural network 130 to achieve this is described in more detail below with reference to FIGS. 2-5.

The system 100 can then iteratively update the policy controller 110 using the demonstration embeddings 132.

In particular, at each iteration of optimization process, the system 100 obtains a robot sequence of robot images 140 of the robotic agent performing the specified task by performing actions selected using the current policy controller, i.e. the policy controller as of the current iteration. Each robot image 140 in the robot sequence corresponds to a respective demonstration image in the demonstration sequence, i.e., is taken at approximately the same time during performance of the task as one of the demonstration images. The system 100 can obtain the robot sequence by causing (or by having another system cause) the robotic agent 112 to perform actions defined by outputs of the current policy controller.

The system 100 then processes each robot image 140 in the robot sequence using the time contrastive neural network 130 to generate a respective robot embedding 142 for each of the robot images.

An optimization engine 150 then updates the current policy controller using the demonstration embeddings 132 and the robot embeddings 142. In particular, the optimization engine 150 updates the current policy controller by performing an iteration of a reinforcement learning technique to optimize a reward function that depends on, for each demonstration image 120, a distance between the demonstration embedding 132 of the demonstration image 120 and the robot embedding 142 of the corresponding robot image 140. Updating the policy controller based on these distances is described in more detail below with reference to FIG. 6.

By iteratively updating the policy controller 110 in this manner, the system 100 causes distances between corresponding demonstration and robotic, or robot, embeddings to be reduced and performance on the specified task by the robotic agent 112 to be improved. In other words, the policy controller 110 is updated so that actions performed by the robotic agent 112 accurately "imitate" the actions performed by the demonstrating agent in the demonstration images 120. Because the demonstrating agent successfully performed the task, accurately imitating the actions performed by the demonstrating agent causes the robotic agent 112 to successfully perform the task.

The system 100 can terminate this iterative updating once the performance of the robotic agent 112 on the robotic task is satisfactory (for example, the distances between corresponding demonstration and robotic embeddings satisfy one or more predetermined criteria) or when some other termination criteria are reached, e.g., a specified amount of time has elapsed.

As will be described below, the time contrastive neural network 130 has been trained in an unsupervised manner, i.e., entirely from unlabeled image sequences. The trained time contrastive neural network 130 is then used to provide the supervision for the optimization of the policy controller 110 without any external supervision being required. Accordingly, the robotic agent 112 can achieve high quality performance on the robotic task only from video or other image sequence data of another agent performing the task and without any external supervision. Efficiency of the process may therefore be improved.

Because of the properties of the numeric embeddings described above, e.g., invariance to viewpoint, the system 100 can effectively update the policy controller 110 even when the robot images 140 are captured from a different view than the demonstration images 120. Utility of the system may therefore be improved. In the example of FIG. 1, the robot images 140 are from a first person view, i.e., a view captured by a camera of the robotic agent 112 as the agent 112 performs the task. The demonstration images 120, on the other hand, are captured from a third person view, i.e., a view that a second agent who is observing the agent depicted in the demonstration images 120, would see. In some other cases, however, the robot images and the demonstration images can be captured from the same viewpoint.

Once the controller 110 has been optimized, the system can use the optimized controller 110 to control the agent 112 as the agent performs the robotic task or can provide data specifying the optimized controller 110, e.g., data specifying the parameters or weights of the optimized controller 110, to another system for use in controlling the agent 112.

Figure 2:
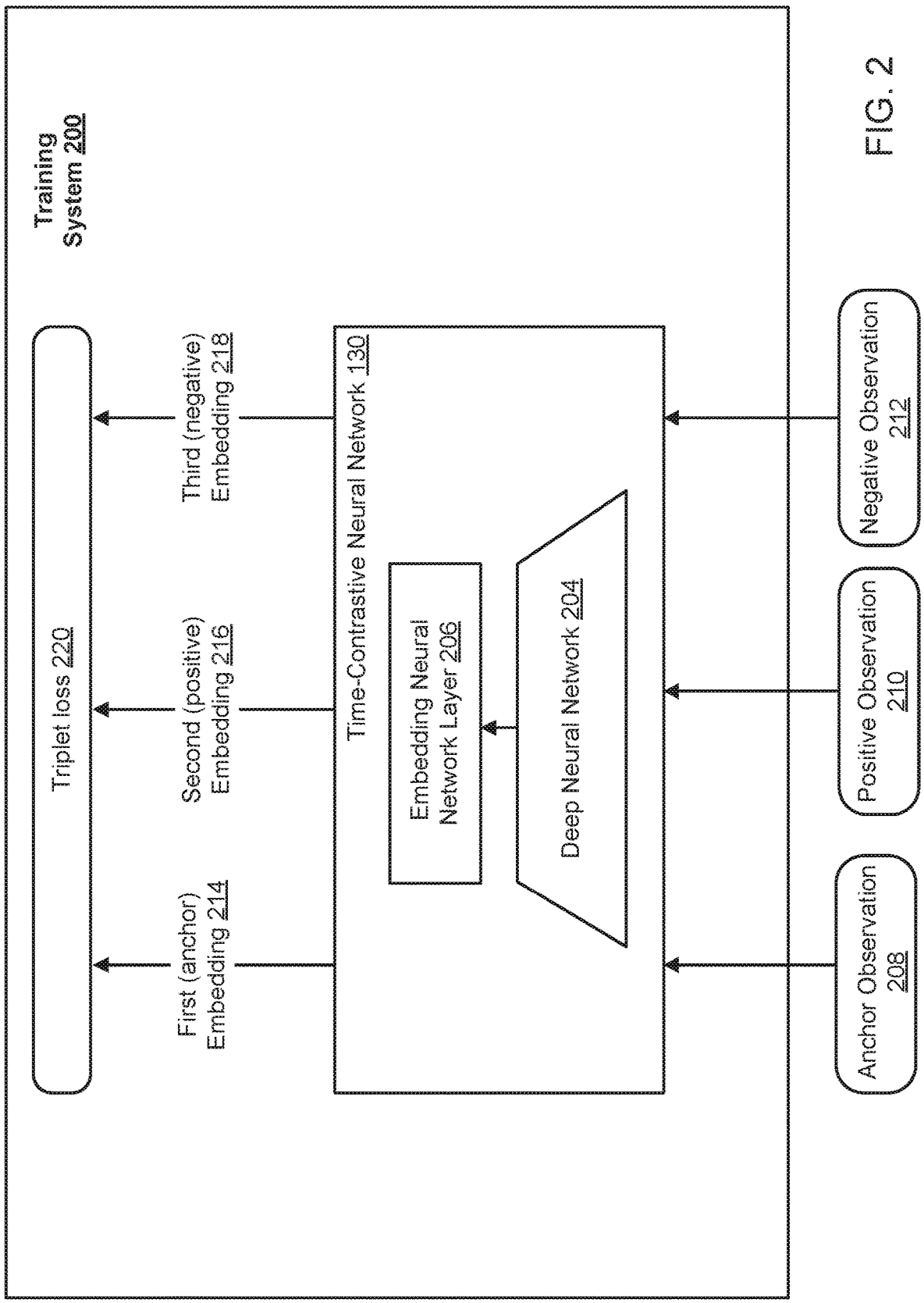
FIG. 2 shows an example training system configured to train a time-contrastive neural network.

FIG. 2 shows an example training system 200 that trains the time-contrastive neural network 130 using a gradient of a time-contrastive loss. The training system 200 can be implemented as computer programs on one or more computers in one or more locations.

In particular, as described above, the time-contrastive neural network 130 is configured to receive an input observation characterizing a state of an environment and to process the input observation to generate a numeric embedding of the state of the environment. The numeric embedding is an ordered collection of numeric values, e.g., a vector of floating point values or of quantized floating point values. An observation characterizing the state of an environment can be an image of the environment, or a frame taken from a video of the environment. In some implementations, the observation can also include other kinds of data collected from the environment, e.g., tactile sensor data or audio data. Generally, the environment includes an agent (e.g., a robotic agent or human) that is moving in the environment or is interacting with other objects in the environment to perform a specific task, e.g., robotic manipulation task, liquid pouring task, or robotic imitation task.

The system 200 can train the neural network 130 on training data that is collected while an agent interacts with the environment. The agent can be the robotic agent 112, the demonstrating agent depicted in the demonstration images, or yet another agent.

In general, one the time-contrastive neural network 130 has been trained, the system 200 or the system 100 can use the trained time-contrastive neural network 130 to optimize the policy controller 110 of FIG. 1.

The time-contrastive neural network 130 includes a deep neural network 204 followed by an embedding neural network layer 206. The embedding neural network layer 206 is a fully connected neural network layer, e.g., a fully connected layer with a number of units equal to the number of numeric values in the embeddings.

In some implementations, the deep neural network 204 may include part of an Inception model followed by one or more convolutional neural network layers, a spatial softmax layer and a fully connected layer. The part of an Inception model included in the deep neural network 204 can be an Inception model up until the "Mixed_5d" layer, which is shown in the open-source code available at https://github.com/tensorflow/models/blob/master/research/slim/nets/inception_v3.py. An example of an Inception model is described in detail in C. Szegedy et al. "Rethinking the inception architecture for computer vision." CoRR, abs/2522.00567, 2025, the contents of which in regard to at least the Inception model are hereby incorporated by reference. For each feature dimension in an activation map received from previous layers (e.g. in a 209×209×32 activation map, the image is 209×209 and there are 32 feature dimensions), the spatial softmax layer is configured to output the spatial coordinates where the feature is maximally activated. An example of a spatial softmax layer is described in detail in C. Finn et al. "Learning visual feature spaces for robotic manipulation with deep spatial autoencoders." CoRR, abs/2509.06293, 2025, the contents of which in regard to at least the spatial softmax layer are hereby incorporated by reference.

In some cases, the system 200 can train time-contrastive neural network 130 from scratch. In some other cases, part of the time-contrastive neural network 130 can be pre-trained and used as a baseline for further training (e.g., the deep neural network 204 may have pre-trained weights from an Inception model trained on an object recognition task).

As part of training the time-contrastive neural network 130, the training system 200 obtains training input data including multiple "triples" of training observations. In some cases, the training observations include observations captured from multiple different viewpoints by multiple modalities. In other cases, the training observations include observations captured from a single viewpoint by a single modality. Generally, a modality specifies an input capturing device that captures observations (e.g., images, audios, or videos) characterizing states of an environment from a specific viewpoint. An input capturing device can be, for example, a camera, audio capturing device, video recorder, or tactile input capturing device.

Figure 3:
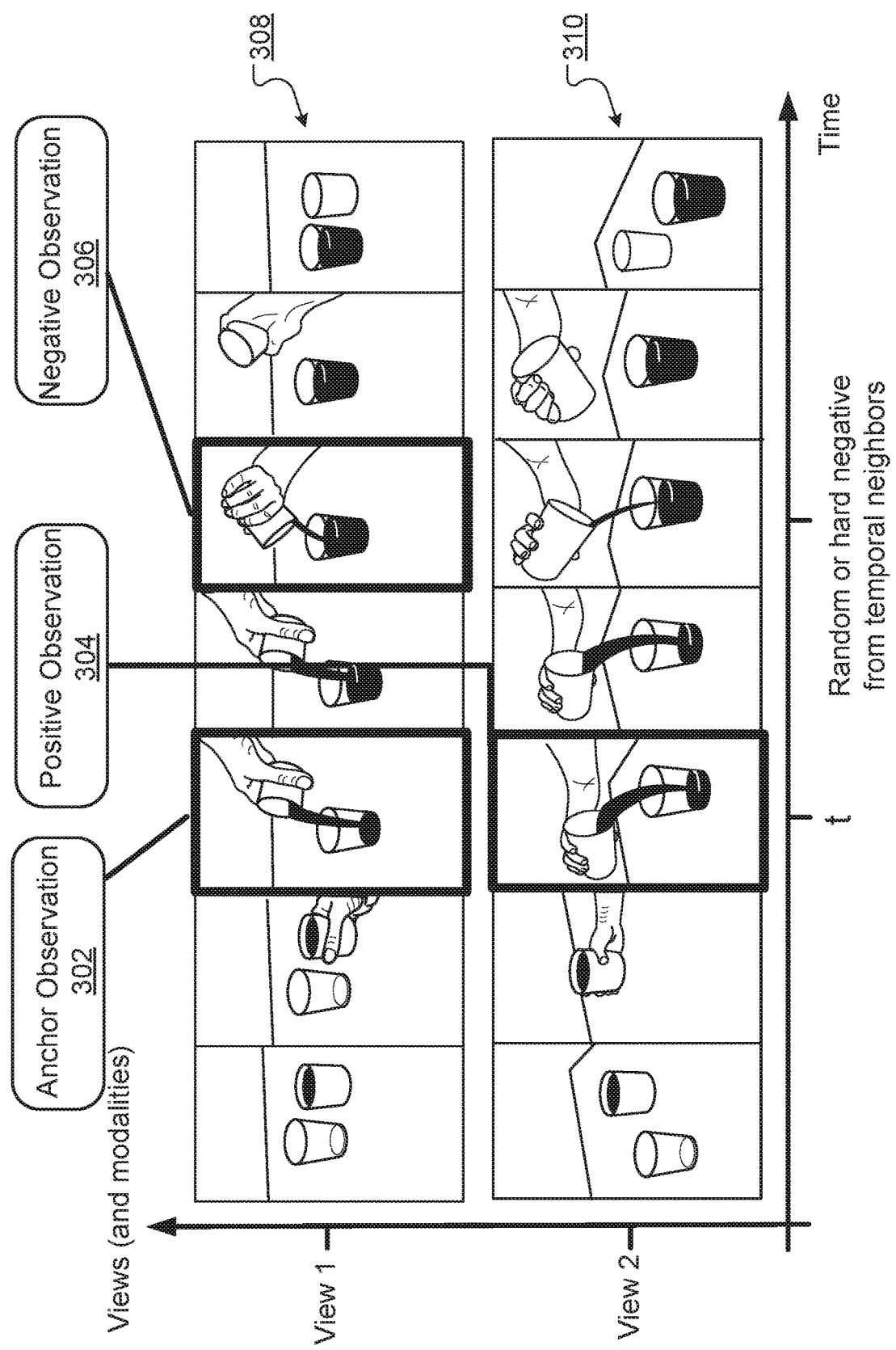
FIG. 3 shows an example triple of observations captured by two different modalities.

In particular, in some implementations (hereafter referred to as multi-view implementations), each triple of observations includes (i) an anchor observation 208 captured by a first modality, (ii) a positive observation 210 that is co-occurring (i.e. occurring at substantially the same time) with the anchor observation 208 and that is captured by a second, different modality, and (iii) a negative observation 212 captured by the first modality that is not co-occurring with the anchor observation. In some cases, the observations are images, with the first modality being a camera at a first viewpoint and the second modality being a camera at a second, different viewpoint. In general, however, the first and second modalities can be two different modalities of the same or of different types, e.g., cameras, audio capturing devices, tactile input capturing devices, and so on. An example of anchor, positive, and negative observations captured by two modalities at two different viewpoints is illustrated in FIG. 3 (described below).

In some implementations, the pair of first and second modalities are the same for all of the triples of observations included in the training input data.

In some implementations, some triples of observations in the training input data can be captured by the pair of first and second modalities, while some other triples of observations in the training input data are captured by a different pair of first and second modalities. That is, in the example where the modalities are cameras at various locations, the relative locations of the cameras that captured the positive and negative observations can vary across different triples.

Figure 4:
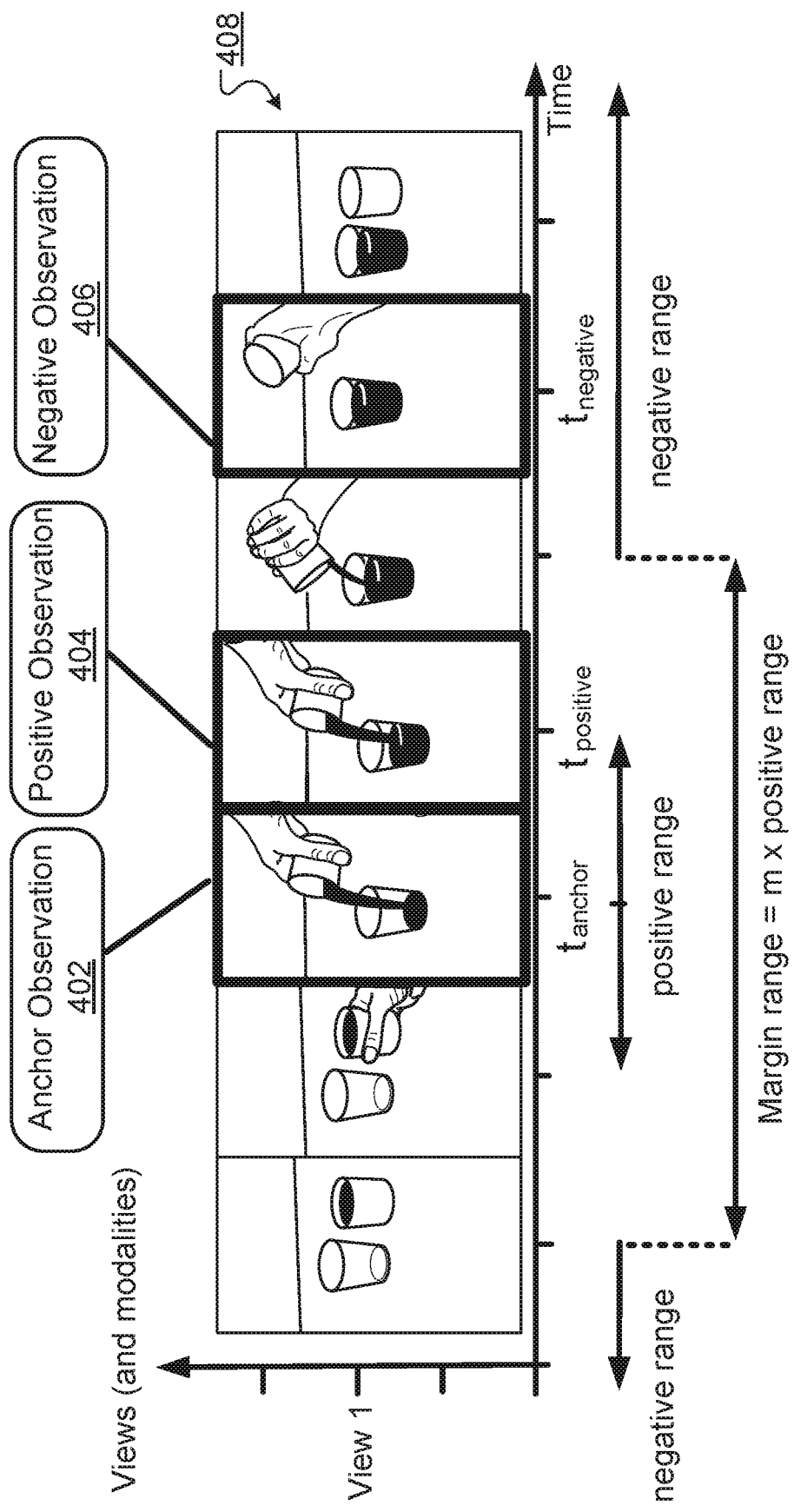
FIG. 4 shows another example triple of observations including an anchor observation, a positive observation, and a negative observation captured by a single modality.

In some other implementations (hereafter referred to as single-view implementations), each triple of observations includes (i) an anchor observation 208 captured by the modality, (ii) a positive observation 210 captured by the modality and being within a margin temporal neighborhood (or margin range) of the anchor observation 208, and (iii) a negative observation 212 captured by the modality and being outside of the margin temporal neighborhood of the first observation, i.e., the negative observation 212 is within a negative range of the first observation. The margin range of the anchor observation 208 defines a predetermined time window around the anchor observation 208. For example, assuming the anchor observation 208 is captured at the timestep t, the margin range of the anchor observation 208 includes observations that are captured from time step t−n to time step t+n, where n is a predetermined number of time steps. n can be a small number of time steps such as one, two, five, or ten seconds. In other words, the (margin) temporal neighborhood, or margin range, represents a predetermined time window defining a window, or period, of time, around the time at which the anchor observation was captured (i.e. a window of time around time step t). The positive observation 210 is captured by the modality within this predetermined time window (i.e. in this example is captured at a time step between t-n and t+n). The negative observation 212 is captured by the modality outside of this predetermined time window (i.e. in this example is captured either before time step t-n or after time step t+n). An example of anchor, positive, and negative observations captured by a single modality at a single viewpoint is illustrated in FIG. 4 (described below).

The training system 200 trains the time-contrastive neural network 130 on the triples in the training input data to determine trained values of the parameters of the time-contrastive neural network 130 from initial values of the parameters by minimizing a "triplet loss". The triplet loss depends on, for a given triple of observations, the distance between the embedding of the positive observation and the negative observation and the distance between the embedding of the positive observation and the anchor observation. In particular, in some implementations the system 200 trains the time-contrastive neural network 130 to minimize the following loss function:

$$L = \Sigma_i^N [\|f(x_i^a) - f(x_i^p)\|_2^2 - \|f(x_i^a) - f(x_i^n)\|_2^2 + \alpha]_+,$$

where f( ) represents the time-contrastive neural network 130, i.e., f(x) is an embedding generated by the time-contrastive neural network 130 for a given observation x. The time-contrastive neural network 130 may embed an observation x into an embedding space such as a d-dimensional Euclidean space. $x_i^a$ is the anchor observation 208, $x_i^p$ is the positive observation 210, and $x_i^n$ is the negative observation. N is the number of triples of observations in the training input data. α is a constant value that defines the desired margin between the two distance in the loss function.

This triplet loss will also be referred to in this specification as a "mirror loss" or a "time-contrastive loss".

In particular, for a given triple including anchor, positive, and negative observations, the training system 200 determines a gradient of the triplet loss and then uses the gradient to update the values of the parameters of the time-contrastive neural network 130.

Specifically, the system 200 processes the anchor observation 208 using the time-contrastive neural network 130 in accordance with the current values of the network parameters to generate a first embedding 214. The system 200 processes the positive observation 210 using the time-contrastive neural network 130 in accordance with the current values of the network parameters to generate a second embedding 216. The system 200 processes the negative observation 212 using the time-contrastive neural network 130 in accordance with the current values of the network parameters to generate a third embedding 218.

The system 200 then determines the triplet loss 220 from (i) a first distance between the first embedding 214 and the second embedding 216 and (ii) a second distance between the first embedding 214 and the third embedding 218.

The system 200 can adjust the current values of the network parameters using conventional neural network training technique, e.g., a gradient descent-based training technique. For example, the system backpropagates the gradient of the objective function, i.e., of the triplet loss, to determine a respective updated value for each of the network parameters of the time-contrastive neural network 130.

By updating the values of the network parameters to minimize the triplet loss, the system 200 ensures that the trained time-contrastive neural network 130 can generate numeric embeddings that are invariant to certain transformations, e.g., viewpoint, occlusions, motion-blur, lighting, background or object instances. Thus, the embeddings generated by the trained time-contrastive neural network 130 can be employed to improve performance on a variety of tasks that require an accurate characterization of the state of an environment, including the tasks described above with reference to FIG. 1. The invariance to transformations such as viewpoint, occlusions, motion-blur, lighting, background or object instances, can therefore improve performance of robotic agents.

FIG. 3 shows an example triple of observations including an anchor observation 302, a positive observation 304, and a negative observation 306 that are used to train the time-contrastive neural network 102. The observations 302-306 are images captured by two different modalities (and from two different viewpoints). Such an arrangement may be cheaper, simpler, and more practical than arrangements involving human labeling, for example.

In this example, a first camera captures a sequence of images 308 of a hand (of an agent) pouring liquid into a cup from the first viewpoint. The agent can be a human or a robotic agent. The first viewpoint (view 1) can be a first person view, i.e., a view captured by a camera of the first agent that is pouring the liquid into the cup would see. Simultaneously, a second camera captures a sequence of image 310 of the same hand from a second viewpoint. The second viewpoint (view 2) can be a third party view, i.e., a view that a second agent, who is observing the first agent pouring the liquid into the cup, would see.

A first image is selected from the sequence of image 308 as an anchor image 302. The anchor image 302 can be randomly selected from the sequence of images 308. A second image that was taken at the same time as the anchor image 302 but by the second camera is selected as a positive image 304. A third image is selected from the sequence of images 308 as a negative image 306. The negative image 306 can be selected randomly from the images captured by the first camera that are within a temporal neighborhood (i.e. within a predetermined time window) of the anchor image 302, e.g., images that are taken two, five, or ten seconds after the anchor image 302 was taken.

As shown in FIG. 3, the first, or anchor, image 302 is captured at time step t, and the third, or negative, image 306 is captured at time step t+2, which is within the temporal neighborhood of the anchor image 302. The negative image 306 is in the same sequence 308 as the anchor image 302. Being trained on the triple of anchor image 302, positive image 304, and negative image 306, the time-contrastive neural network 102 can learn to capture properties that vary over time but are consistent across views, such as hand poses and amounts of poured liquid, while becoming invariant to irrelevant transformations such as background or lighting.

FIG. 4 shows another example triple of observations including an anchor observation 402, a positive observation 404, and a negative observation 406 captured by a single modality (from a single viewpoint).

In this example, a single camera captures a sequence of image 408 of a hand pouring liquid into a target container from a single viewpoint (view 1, which is a self-view). A first image from the sequence 408 is selected as the anchor image 402. A second, or positive, image 404 is selected from images that are within a margin range around the anchor image 402. The positive image 404 can be randomly selected within the margin range. The margin range of the anchor image 402 defines a predetermined time window around the anchor image 402. For example, as shown in FIG. 4, the anchor image 402 is captured at the time step $t_{anchor}$, and the margin range of the anchor image 402 includes images that are captured from time step $t_{anchor}-2$ to time step $t_{anchor}+2$.

A third, or negative, image 406 is selected from images that are within a negative range of the anchor image 402, i.e., a range that is outside of the margin range of the anchor image 402.

The triple of images 402, 404 and 406 can be used as training input data to train the time-contrastive neural network 130 using the techniques described in detail above with reference to FIG. 2. By training the time-contrastive neural network 130 using images selected in this manner, the system 100 ensures that the neural network 130 can learn attributes in each observation and properties of an interaction. In the example of FIG. 4, the neural network 130 can learn to distinguish different poses of the hand, e.g., whether or not the hand is contacting the white cup. The neural network 130 can also learn the tilt of the white cup, or the amount of liquid currently in the target container or its viscosity.

Figure 5:
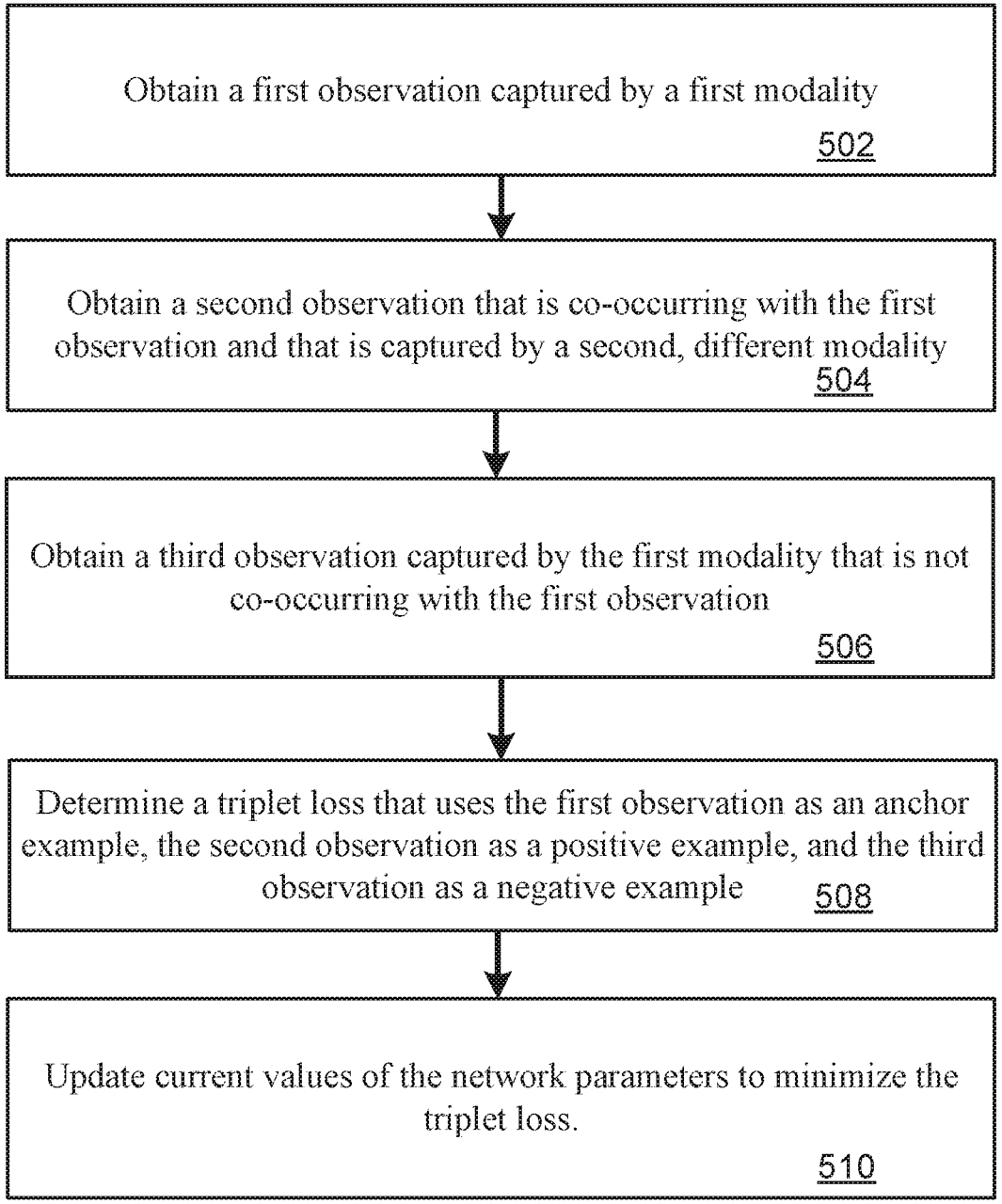
FIG. 5 is a flow diagram of an example process for training a time-contrastive neural network.

FIG. 5 is a flow diagram of an example process 500 for training a time-contrastive neural network using observations captured by multiple modalities. The neural network is configured to receive an input observation characterizing a state of an environment and to process the input observation to generate a numeric embedding of the state of the environment. For convenience, the process 500 will be described as being performed by a system of one or more computers located in one or more locations. For example, a training system, e.g., the training system 200 of FIG. 2, appropriately programmed in accordance with this specification, can perform the process 500.

The system can repeatedly perform the process 500 on different triples of observations to train the neural network.

The system obtains a first (or anchor) observation captured by a first modality (step 502). The first observation may be an image and the first modality may be a camera at a first viewpoint.

The system obtains a second (or positive) observation that is co-occurring with the first observation and that is captured by a second, different modality (step 504). The second observation may be an image and the second modality may be a camera at a second viewpoint.

The system obtains a third (or negative) observation captured by the first modality that is not co-occurring with the first observation (step 506).

In some cases, the system may select the third observation randomly from the observations captured by the first modality that are within the temporal neighborhood of the first observation.

In some other cases, the system may select as the third observation an observation that is a hard negative relative to the first observation from a sequence of observations captured by the first modality that are within the temporal neighborhood of the first observation. The hard negative observation is the observation within the temporal neighborhood that has an embedding that is farthest away from the embedding of the first observation.

The system determines a triplet loss that uses the first observation as an anchor example, the second observation as a positive example, and the third observation as a negative example (step 508).

In particular, the system processes the first observation using the neural network in accordance with the current values of the network parameters to generate a first embedding. The system processes the second observation using the neural network in accordance with the current values of the network parameters to generate a second embedding. The system processes the third observation using the neural network in accordance with the current values of the network parameters to generate a third embedding. The system determines the triplet loss from (i) a first distance between the first embedding and the second embedding and (ii) a second distance between the first embedding and the third embedding.

For example, the system can determine the triplet loss for a given triple of observation as follows:

$$\text{Triplet loss} = \|f(x_i^a) - f(x_i^p)\|_2^2 - \|f(x_i^a) - f(x_i^n)\|_2^2 + \alpha,$$

where f( ) is an embedding function that embeds an observation x into an embedding space (e.g., a d-dimensional Euclidean space) and can represent the neural network being trained, $x_i^a$ is the anchor observation, $x_i^p$ is the positive observation, and $x_i^n$ is the negative observation.

The system then updates values of the network parameters to minimize the triplet loss (step 510). The system can update the values of the network parameters using conventional neural network training techniques, e.g., a gradient descent-based training technique. For example, the system backpropagates the gradient of the triplet loss to determine a respective updated value for each of the network parameters of the neural network.

Figure 6:
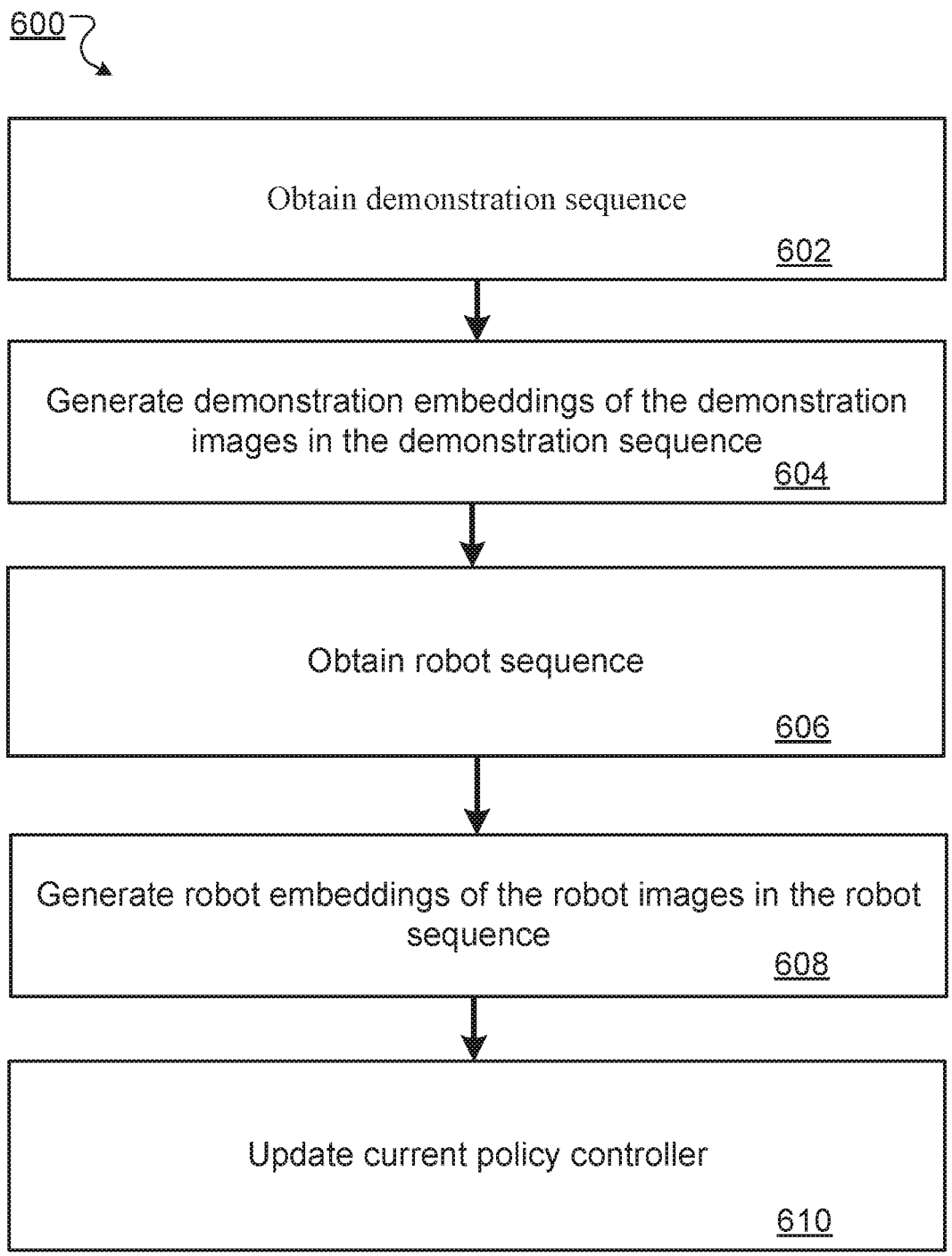
FIG. 6 is a flow diagram of an example process for optimizing a policy controller.

FIG. 6 is a flow diagram of an example process 600 for optimizing a policy controller. For convenience, the process 600 will be described as being performed by a system of one or more computers located in one or more locations. For example, a reinforcement learning system, e.g., the reinforcement learning system 100 of FIG. 1, appropriately programmed in accordance with this specification, can perform the process 600.

The system obtains a demonstration sequence that includes demonstration images of another agent performing a version of the specified task (step 602). As described above, the other agent can be any appropriate agent that is proficient at performing the task. For example, the other agent can be a human demonstrator or another robotic agent that has already been trained to perform the task or has been hard-coded to perform the task. The version of the specified task may be the same as the specified task to be performed by the agent or may differ in certain ways from the task to be performed by the agent. For example, if the task is to move an object to a destination location in the environment the version of the task performed in the demonstration images may move a somewhat different object from the object that the robotic agent will be tasked with moving.

The system processes each demonstration image in the demonstration sequence using the trained time contrastive neural network to generate a respective demonstration embedding for each demonstration image (step 604). The demonstration embedding is a numeric embedding of the respective demonstration image, wherein the demonstration embedding characterizes a state of the environment as depicted in the respective demonstration image.

The system then repeatedly performs steps 606 through 610 to optimize policy controller used to control the robotic agent as it performs the robotic (specified) task.

The system obtains a robot sequence (step 606). The robot sequence is a sequence of robotic images of the robotic agent performing the specified task by performing actions selected using the current policy controller. For example, the system or another system can cause the robotic agent to (i) perform the task by repeatedly selecting actions using the current policy controller and instructing the robotic agent to perform each selected action and (ii) while performing the task, regularly capture images using a camera sensor of the robotic agent. Each robot image in the robot sequence corresponds to a respective demonstration image in the demonstration sequence, i.e., is taken at approximately the same time during performance of the task as one of the demonstration images.

The system processes each robot image in the robotic sequence using the time contrastive neural network to generate a respective robot embedding for each robot image (step 608). The robot embedding is a numeric embedding of the respective robot image, wherein the robot embedding characterizes a state of the environment as depicted in the respective robot image.

The system updates the current policy controller (step 610). In particular, the system updates the policy controller by performing an iteration of a reinforcement learning technique to optimize, i.e., maximize, a reward function that depends on, for each demonstration image, a distance between the demonstration embedding of the demonstration image and the robot embedding of the corresponding robot image. That is, the reward for a given demonstration image—corresponding robot image pair is higher when the distance between the corresponding embeddings is shorter. Such a reward function can enable efficient reinforcement learning that is practical for real-world robotic applications.

In other words, the system generates a reward for each demonstration image-corresponding robot image pair and uses a reinforcement learning technique that takes the rewards as input to update the current policy controller, i.e., updates the current policy controller using a reinforcement learning technique that updates the policy controller to increase the received rewards. The system can use any appropriate reinforcement learning technique that takes rewards as input to perform the optimization step. For example, the reinforcement learning technique can be a model-free technique, e.g., PI2, a model-based technique, e.g., LQR, or a technique that combines model-based and model-free algorithms, e.g., PILQR.

In some implementations, the reward for a demonstration image and corresponding robot image is based on the Euclidean distance between the demonstration embedding of the demonstration image and the robot embedding of the corresponding robot image. For example, the reward function can include a Euclidean distance term that is a square of the Euclidean distance. As another example, the reward function can include a Huber-style loss term that is a square root of a sum between a constant value and a square of the Euclidean distance between the demonstration embedding of the demonstration image and the robot embedding of the corresponding robot image. In some of these implementations, the reward function R is a weighted sum of the Euclidean distance term and the Huber-style loss term and satisfies:

$$R(v_t, w_t) = -\alpha \|w_t - v_t\|_2^2 - \beta \sqrt{\gamma + \|w_t - v_t\|_2^2},$$

where $v_t$ is the demonstration embedding of the demonstration image in a t-th position in the demonstration sequence, $w_t$ is the robot embedding of the robot image in a t-th position in the robot sequence, $\alpha$ and $\beta$ are fixed weighting parameters, and $\gamma$ is a small positive constant value.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of optimizing a policy controller used to select actions to be performed by a robotic agent interacting with an environment to perform a specified task, the method comprising:
obtaining a demonstration sequence of demonstration images of another agent performing a version of the specified task;
processing each demonstration image in the demonstration sequence using a time contrastive neural network to generate a respective demonstration embedding of each of the demonstration images, wherein the time contrastive neural network has been trained to receive an input image of the environment and to process the input image to generate a numeric embedding of the input image that characterizes a state of the environment as depicted in the input image, and the time contrastive neural network has been trained based on minimizing a triplet loss that depends on, for a triple including a positive observation, a negative observation, and an anchor observation, a first distance between embeddings of the positive observation and the negative observation and a second distance between embeddings of the positive observation and the anchor observation;
obtaining a robot sequence of robot images of the robotic agent performing the specified task by performing actions selected using a current policy controller, wherein each robot image in the robot sequence corresponds to a respective demonstration image in the demonstration sequence;
processing each robot image in the robot sequence using the time contrastive neural network to generate a respective robot embedding for each of the robot images; and
updating the current policy controller by performing an iteration of a reinforcement learning technique to optimize a reward function that depends on, for each demonstration image, a distance between the demonstration embedding of the demonstration image and the robot embedding of the corresponding robot image.

2. The method of claim 1, wherein the other agent is a human demonstrator.

3. The method of claim 1, wherein the other agent is a different robotic agent.

4. The method of claim 1, wherein the policy controller is a trajectory-centric controller.

5. The method of claim 4, wherein the policy controller is a time-varying Gaussian controller.

6. The method of claim 1, wherein the reinforcement learning technique is a technique that combines model-based and model-free algorithms.

7. The method of claim 1, wherein the reward function includes a Euclidean distance term that is a square of the Euclidean distance between the demonstration embedding of the demonstration image and the robot embedding of the corresponding robot image.

8. The method of claim 1, wherein the reward function includes a Huber-style loss term that is a square root of a sum between a constant value and a square of the Euclidean distance between the demonstration embedding of the demonstration image and the robot embedding of the corresponding robot image.

9. The method of claim 1, wherein the reward function satisfies:

$$R(v_t, w_t) = -\alpha \|w_t - v_t\|_2^2 - \beta \sqrt{\gamma + \|w_t - v_t\|_2^2},$$

wherein $v_t$ is the demonstration embedding of the demonstration image in a t-th position in the demonstration sequence, $w_t$ is the robot embedding of the robot image in a t-th position in the robot sequence, $\alpha$ and $\beta$ are fixed weighting parameters, and $\gamma$ is a small positive constant value.

10. The method of claim 1, wherein the images in the demonstration sequence are captured from a different viewpoint than the images in the robot sequence.

11. The method of claim 10, wherein images in the demonstration sequence are captured from a third-party view relative to the other agent and the images in the robot sequence are captured from a first-party view relative to the robotic agent.

12. The method of claim 1, wherein the corresponding robot image is the robot image that is in the same position in the robot sequence as the demonstration image is in the demonstration sequence.

13. The method of claim 1, wherein the time contrastive neural network has a plurality of network parameters and wherein the method further comprises:
training the time contrastive neural network to generate the numeric embeddings, comprising:
obtaining a first image of the environment captured by a first modality;
obtaining a second image that is co-occurring with the first image and that is captured by a second, different modality;
obtaining a third image captured by the first modality that is not co-occurring with the first image;
determining a gradient of the triplet loss that uses the first image as an anchor example, the second image as a positive example, and the third image as a negative example; and
updating current values of the network parameters using the gradient of the triplet loss.

14. The method of claim 13, wherein the first modality is a camera at a first viewpoint, and wherein the second modality is a camera at a second, different viewpoint.

15. The method of claim 13, wherein the third image is within a predetermined time window of the first image.

16. The method of claim 15, wherein obtaining the third image comprises:
selecting the third image randomly from the images captured by the first modality that are within the predetermined time window of the first image.

17. The method of claim 15, wherein obtaining the third image comprises:
selecting an image that is a hard negative relative to the first image from the images captured by the first modality that are within the predetermined time window of the first image.

18. The method of claim 13, wherein determining the gradient of the triplet loss comprises:
processing the first image using the time contrastive neural network in accordance with the current values of the network parameters to generate a first embedding;
processing the second image using the time contrastive neural network in accordance with the current values of the network parameters to generate a second embedding;
processing the third image using the time contrastive neural network in accordance with the current values of the network parameters to generate a third embedding; and determining the triplet loss from (i) a first distance between the first embedding and the second embedding and (ii) a second distance between the first embedding and the third embedding.

19. The method of claim 13, wherein the first image, the second image, and the third image are of the other agent interacting with the environment.

20. The method of claim 13, wherein the first image, the second image, and the third image are of the robotic agent interacting with the environment.

21. The method of claim 1, further comprising controlling the robotic agent using the optimized policy controller.

22. A system comprising one or more computers and one or more storage devices storing instructions that when executed by the one or more computers cause the one or more computers to perform operations for optimizing a policy controller used to select actions to be performed by a robotic agent interacting with an environment to perform a specified task, the operations comprising:
  obtaining a demonstration sequence of demonstration images of another agent performing a version of the specified task;
  processing each demonstration image in the demonstration sequence using a time contrastive neural network to generate a respective demonstration embedding of each of the demonstration images, wherein the time contrastive neural network has been trained to receive an input image of the environment and to process the input image to generate a numeric embedding of the input image that characterizes a state of the environment as depicted in the input image, and the time contrastive neural network has been trained based on minimizing a triplet loss that depends on, for a triple including a positive observation, a negative observation, and an anchor observation, a first distance between embeddings of the positive observation and the negative observation and a second distance between embeddings of the positive observation and the anchor observation;
  obtaining a robot sequence of robot images of the robotic agent performing the specified task by performing actions selected using a current policy controller, wherein each robot image in the robot sequence corresponds to a respective demonstration image in the demonstration sequence;
  processing each robot image in the robot sequence using the time contrastive neural network to generate a respective robot embedding for each of the robot images; and
  updating the current policy controller by performing an iteration of a reinforcement learning technique to optimize a reward function that depends on, for each demonstration image, a distance between the demonstration embedding of the demonstration image and the robot embedding of the corresponding robot image.

23. One or more non-transitory computer storage media storing instructions that when executed by one or more computers cause the one or more computers to perform operations for optimizing a policy controller used to select actions to be performed by a robotic agent interacting with an environment to perform a specified task, the operations comprising:
  obtaining a demonstration sequence of demonstration images of another agent performing a version of the specified task;
  processing each demonstration image in the demonstration sequence using a time contrastive neural network to generate a respective demonstration embedding of each of the demonstration images, wherein the time contrastive neural network has been trained to receive an input image of the environment and to process the input image to generate a numeric embedding of the input image that characterizes a state of the environment as depicted in the input image, and the time contrastive neural network has been trained based on minimizing a triplet loss that depends on, for a triple including a positive observation, a negative observation, and an anchor observation, a first distance between embeddings of the positive observation and the negative observation and a second distance between embeddings of the positive observation and the anchor observation;
  obtaining a robot sequence of robot images of the robotic agent performing the specified task by performing actions selected using a current policy controller, wherein each robot image in the robot sequence corresponds to a respective demonstration image in the demonstration sequence;
  processing each robot image in the robot sequence using the time contrastive neural network to generate a respective robot embedding for each of the robot images; and
  updating the current policy controller by performing an iteration of a reinforcement learning technique to optimize a reward function that depends on, for each demonstration image, a distance between the demonstration embedding of the demonstration image and the robot embedding of the corresponding robot image.

* * * * *